(12) United States Patent
Jefferies et al.

(10) Patent No.: US 10,985,550 B1
(45) Date of Patent: Apr. 20, 2021

(54) PROGRESSIVE PROTECTION FUNCTIONS FOR MOTOR OVERLOAD RELAY

(71) Applicant: Schneider Electric USA, Inc., Andover, MA (US)

(72) Inventors: Kevin M. Jefferies, Raleigh, NC (US); Benjamin W. Edwards, Rolesville, NC (US); Matthew L. White, Cary, NC (US); Alan E. Freeman, Raleigh, NC (US); Richard K. Weiler, Wake Forest, NC (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 16/654,205

(22) Filed: Oct. 16, 2019

(51) Int. Cl.
*H02H 7/00* (2006.01)
*H02H 7/08* (2006.01)
*H02H 7/085* (2006.01)

(52) U.S. Cl.
CPC ........ *H02H 7/0844* (2013.01); *H02H 7/0816* (2013.01); *H02H 7/0855* (2013.01)

(58) Field of Classification Search
USPC ....................................................... 318/560
See application file for complete search history.

(56) References Cited

U.S. PATENT DOCUMENTS

| | | | |
|---|---|---|---|
| 7,415,725 B2 | 8/2008 | Henneberry et al. | |
| 7,599,161 B2 | 10/2009 | Premerlani et al. | |
| 10,790,651 B2 * | 9/2020 | Okura | G08C 17/02 |
| 2006/0109074 A1 * | 5/2006 | Lee | H01H 1/504 |
| | | | 337/167 |
| 2006/0113954 A1 * | 6/2006 | Ma | H02P 27/00 |
| | | | 318/803 |

(Continued)

FOREIGN PATENT DOCUMENTS

| | | |
|---|---|---|
| EP | 3107169 A1 | 12/2016 |
| EP | 3447896 A1 | 2/2019 |

OTHER PUBLICATIONS

Rasoulpoor; Investigating Impacts of Sustainable Repair Time and Circuit Breaker Model on Meshed Distribution Networks Reliability Assessment—Journal of Operation and Automation in Power Engineering, vol. 2, No. 1, 2014, pp. 40-48.

(Continued)

*Primary Examiner* — Bentsu Ro
(74) *Attorney, Agent, or Firm* — Locke Lord LLP

(57) ABSTRACT

A progressive protection method automatically adapts a protection trip delay or fault timeout for a motor that is a member of a group of motors performing mutually similar or related tasks, based on the occurrence of a fault in another motor within the group, without requiring manual intervention. If the user requires stringent protection of the motors in a particular application, then the trip delay time for all of the motors in the group, may be shortened in response to recently-detected similar trips of other motors within the group. Alternatively, if the user prefers continuity of service for a particular application, then the trip delay time for all of the motors in the group, may be increased in response to recently-detected similar trips of other motors within the group, based on past experience with the occurrence of fault self-clearing for the motors in the group.

20 Claims, 8 Drawing Sheets

(56) References Cited

U.S. PATENT DOCUMENTS

2007/0291426 A1* 12/2007 Kasunich ............... H02P 9/006
361/33
2014/0265979 A1* 9/2014 Xu .......................... B60L 50/52
318/478

OTHER PUBLICATIONS

Extended European Search Report for European Application No. EP20198517 dated Feb. 19, 2021, 8 pages.

* cited by examiner

US 10,985,550 B1

PROGRESSIVE PROTECTION FUNCTIONS FOR MOTOR OVERLOAD RELAY

TECHNICAL FIELD

The present disclosure relates to protecting electric motors, and more particularly, to protecting a plurality of electric motors performing mutually similar or related tasks.

BACKGROUND

Typical "advanced" motor protection functions such as jam, stall, undercurrent, and overvoltage have their current threshold limits and delay timing fixed by the user upon initial set-up of the system. For example, in jam fault protection, the motor current is compared with a fixed warning current threshold and if the motor current is greater, a jam warning signal is issued. The motor current is also compared with a fixed trip current threshold that is greater than the warning current threshold. If the motor current is greater than the trip current threshold for a duration of a fixed trip delay value, then a jam trip signal is issued that causes the motor current to be interrupted to avoid damaging the motor. Over time, if the user decides that the fixed settings for current threshold and trip delay timing are non-ideal for their application, they must be manually adjusted to better settings.

SUMMARY

In accordance with one embodiment described herein, a progressive protection method automatically adapts a protection trip delay or fault timeout for a motor that is a member of a group of motors performing mutually similar or related tasks, based on the occurrence of a fault in another motor within the group, without requiring manual intervention. For example, if the user requires stringent protection of the motors in a particular application, then the trip delay time for all of the motors in the group, may be shortened in response to recently-detected similar trips of other motors within the group. Alternatively, if the user prefers continuity of service for a particular application, then the trip delay time for all of the motors in the group, may be increased in response to recently-detected similar trips of other motors within the group, based on past experience with the occurrence of fault self-clearing for the motors in the group.

In some embodiments, the motor current is compared with a warning current threshold and if the motor current is greater than the warning current threshold, a fault warning is issued. If the number of fault warnings during a measurement period is greater than a predetermined count, this is referred to herein as a fault consequence. In some embodiments, the motor current is compared with a trip current threshold and if the motor current is greater than the trip current threshold for a duration of a trip delay, a trip is issued, which is also referred to herein as a fault consequence.

In accordance with one embodiment described herein, a method, comprises:

monitoring current used by each electric motor of a plurality of electric motors performing mutually similar or related tasks in an application;

detecting an occurrence of a fault consequence, such as predetermined number of fault warnings or a trip, after an occurrence of a fault for at least one of the electric motors of the plurality;

determining whether to continue running the plurality of electric motors after detecting the occurrence of the fault consequence, based on whether the application requires sustained running of all of the electric motors of the plurality; and changing a duration between an occurrence of a fault and an occurrence of a subsequent fault consequence, from an initial duration to a changed duration, for all of the electric motors of the plurality, based on the determination.

In accordance with another embodiment described herein, an apparatus, comprises:

a memory; and a processing logic, operatively coupled to the memory, to:

monitor current used by each electric motor of a plurality of electric motors performing mutually similar or related tasks in an application;

detect an occurrence of a fault consequence, such as predetermined number of fault warnings or a trip, after an occurrence of a fault for at least one of the electric motors of the plurality;

determine whether to continue running the plurality of electric motors after detecting the occurrence of the fault consequence, based on whether the application requires sustained running of all of the electric motors of the plurality; and change a duration between an occurrence of a fault and an occurrence of a subsequent fault consequence, from an initial duration to a changed duration, for all of the electric motors of the plurality, based on the determination.

The resulting method, apparatus, system, and computer program product automatically modify the trip delay based on other events within the group of motors to better fulfill the user's needs in a particular application without requiring manual intervention.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

DETAILED DESCRIPTION

Figure 1:
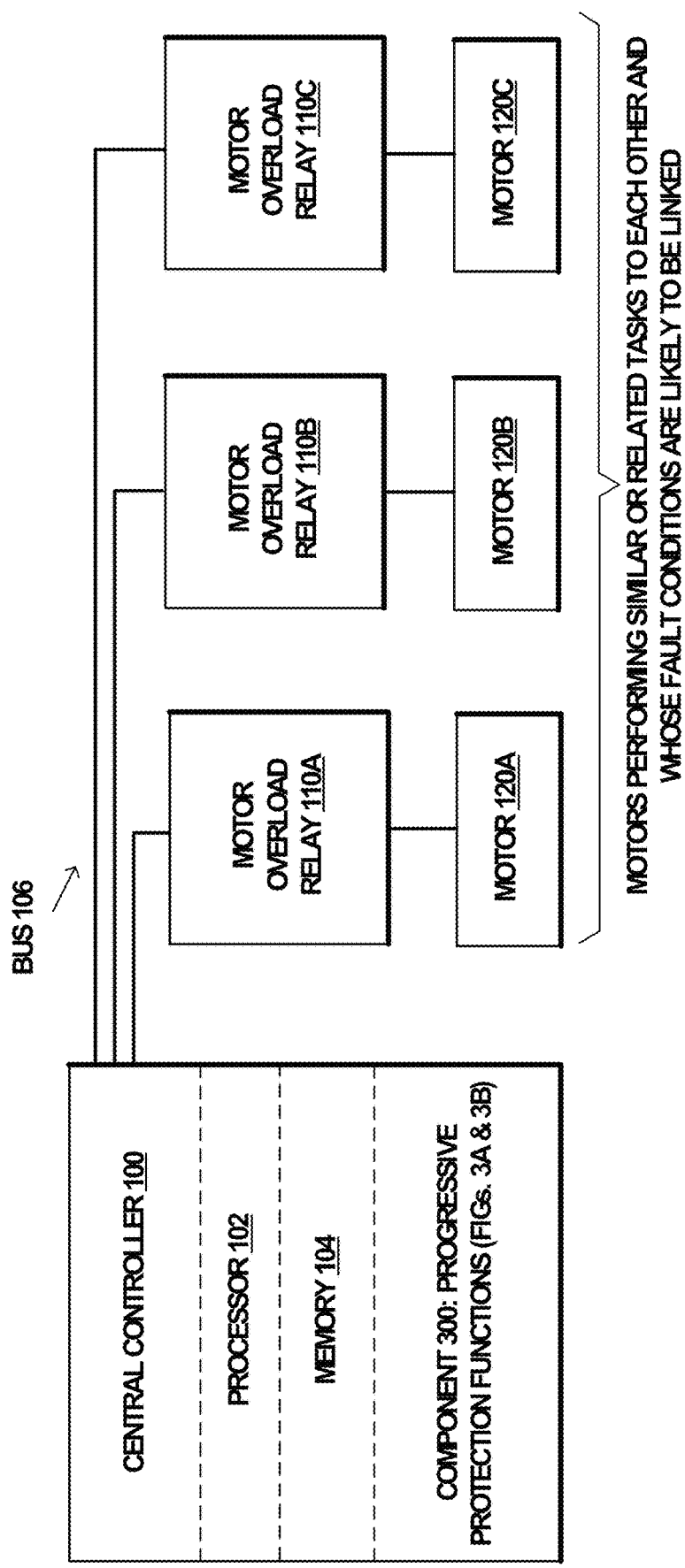
FIG. 1 is an example functional block diagram of a central controller monitoring a plurality of electric motors performing mutually similar or related tasks, according to an embodiment of the disclosure.

FIG. 1 is an example functional block diagram of a central controller 100 monitoring a plurality of electric motors 120A to 120C performing mutually similar or related tasks to each other and whose fault conditions are likely to be linked. For example, large capacity belt conveyors have multiple drive motors performing related tasks, whose fault conditions are likely to be linked. The necessary power for driving the belt conveyors depends on the quantity of transported material and the speed of the belts. In mining applications, for example, the quantity of bulk material being conveyed by the belt at any one time varies and depends on intermittent arrivals of ore carriers. When an overly large load of ore is deposited on the belt, one or more of the multiple drive motors is likely to stall or jam and this fault condition is likely to be linked to the rest of the motors driving the belt.

Examples of groups of motors performing mutually similar or related tasks include:

[a] a conveyor belt with multiple motors,

[b] an oil pipeline with multiple pumps/motors, and

[c] a large refrigeration system with multiple compressors/motors.

Each motor 120A, 120B, and 120C is controlled by a respective motor overload relay 110A, 110B, and 110C, which in turn exchanges information over bus 106 with the central controller 100 for monitoring the electric motors 120A, 120B, and 120C. The central controller 100 measures a duration or fault timeout "T" between an occurrence of a fault and an occurrence of a fault consequence, such as a predetermined number of fault warnings or a trip, for at least one of the electric motors of the plurality 120A, 120B, and 120C.

Various types of faults may be monitored by the central controller 100, including, for example, a jam fault, a stall fault, and a long start fault, which may result in tripping the motor.

[a] Jam Fault

The motor overload relay 110A, for example, reads the current for each of the three phases going to the motor 120A, for example, and tracks it over time relative to certain customer-programed settings. A jam fault protection is specifically looking at the highest phase of current and comparing it to a threshold while in the "run state". If the current exceeds that threshold for longer than a fixed trip delay value "T", then the protection will trip.

For example, in jam fault protection, the motor current is compared with a fixed jam warning current threshold and if the motor current is greater, a jam warning signal is issued. The motor current is also compared with a fixed jam trip current threshold that may be greater than the warning current threshold. If the motor current is greater than the trip current threshold for a duration of a fixed trip delay value "T", then a jam trip signal is issued that causes the motor current to be interrupted to avoid damaging the motor.

Figure 2A:
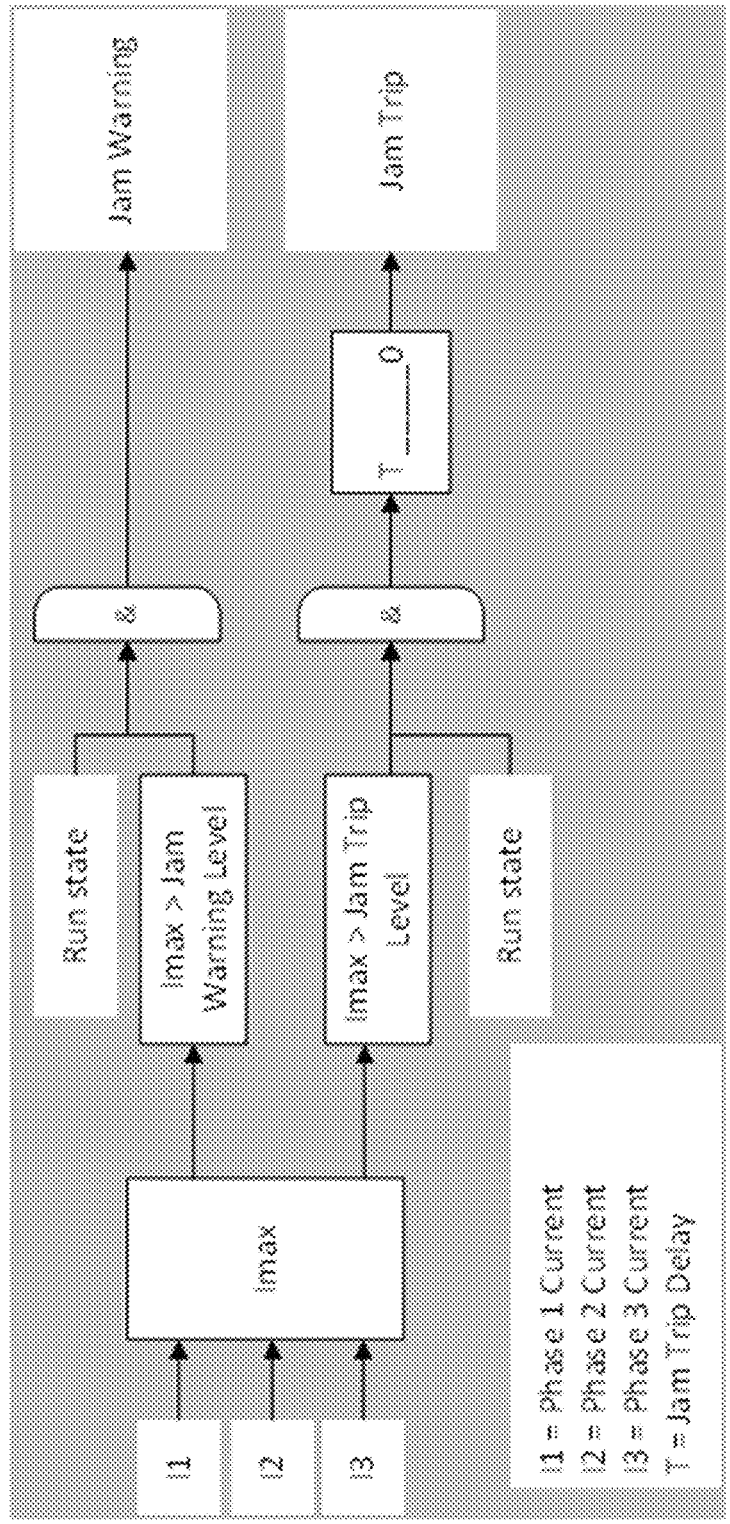
FIG. 2A shows an example graphical view of an example prior art protection algorithm for detecting a jam fault and trip.

The motor overload relay 110A exchanges information with the central controller 100 for monitoring the electric motor 120A. The central controller 100 measures a trip delay or fault timeout between an occurrence of a jam fault and an occurrence of a subsequent trip for the motor 120A. FIG. 2A shows an example graphical view of an example prior art protection algorithm performed by the motor overload relay 110A or the central controller 100 for detecting a jam fault and trip, using a constant value for the trip delay "T". The "run state" generally means that the motor has finished starting and is in its steady-state running mode.

In existing jam protection methods, the trip delay "T" is set as a fixed duration. The fault condition must continue for this period before the motor trip is issued. The following table shows example jam function parameters with a fixed trip delay "T":

| Parameters | Setting Range | Factory Setting |
| --- | --- | --- |
| Fault Enable | Enable/Disable | Enable |
| Fault timeout | 1 . . . 30 s in s increments | 5 s |
| Fault threshold | 100 . . . 800% of FLC in 1% increments | 200% of FLC |
| Warning enable | Enable/Disable | Disable |
| Warning threshold | 100 . . . 800% of FLC in 1% increments | 200% of FLC |

[b] Stall Fault

Figure 2B:
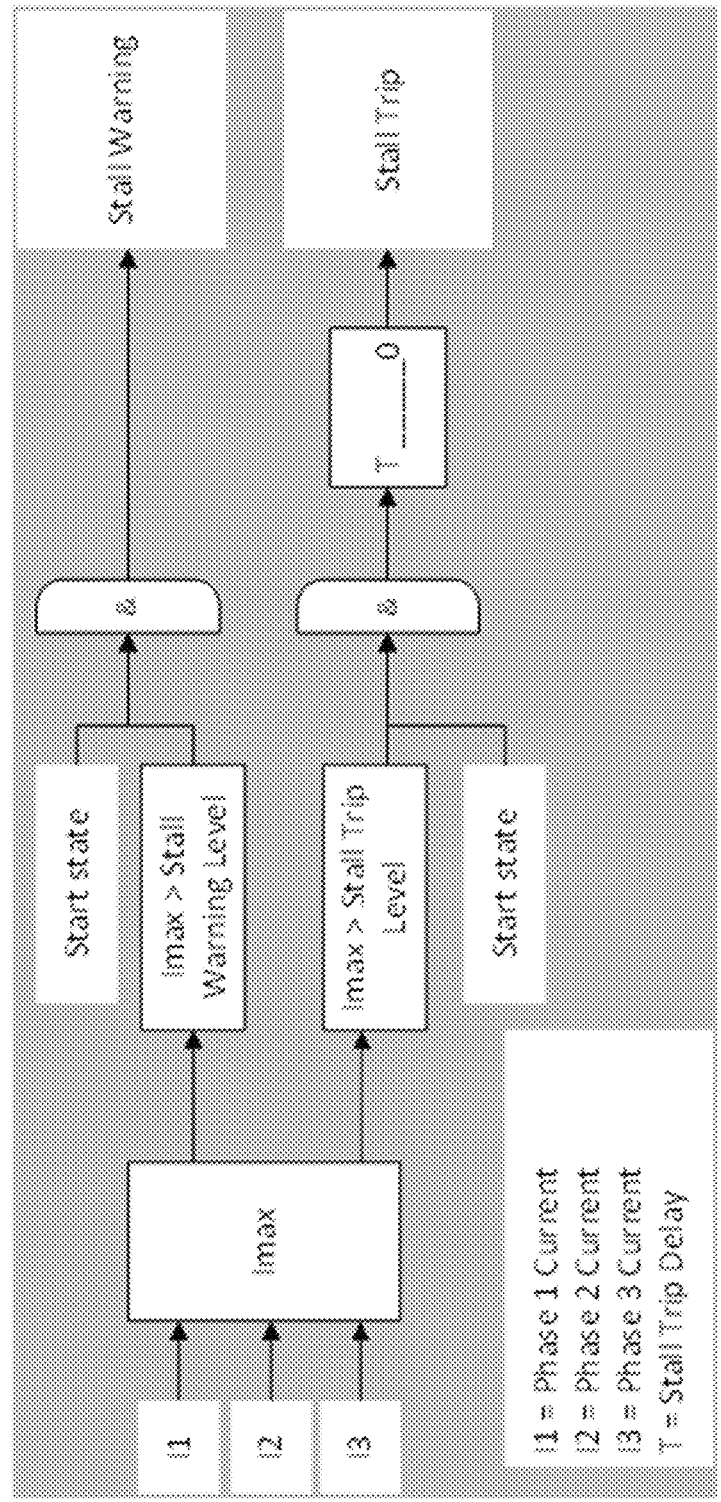
FIG. 2B shows an example graphical view of an example prior art protection algorithm for detecting a stall fault and trip.

The motor overload relay 110A, for example, reads the current for each of the three phases going to the motor 120A, for example, and tracks it over time relative to certain customer-programed settings. A stall fault protection is specifically looking at the highest phase of current and comparing it to a threshold while in the "start state", which is similar to a jam fault, but in a different motor state. If the motor current exceeds that threshold for longer than a set trip delay, then it will trip. The central controller 100 measures a trip delay or fault timeout between an occurrence of a stall fault and an occurrence of a trip for the motor 120A. FIG. 2B shows an example graphical view of an example prior art protection algorithm performed by the motor overload relay 110A or the central controller 100 for detecting a stall fault and trip, using a constant value for the fault timeout "T".

[c] Long Start Fault

Figure 2C:
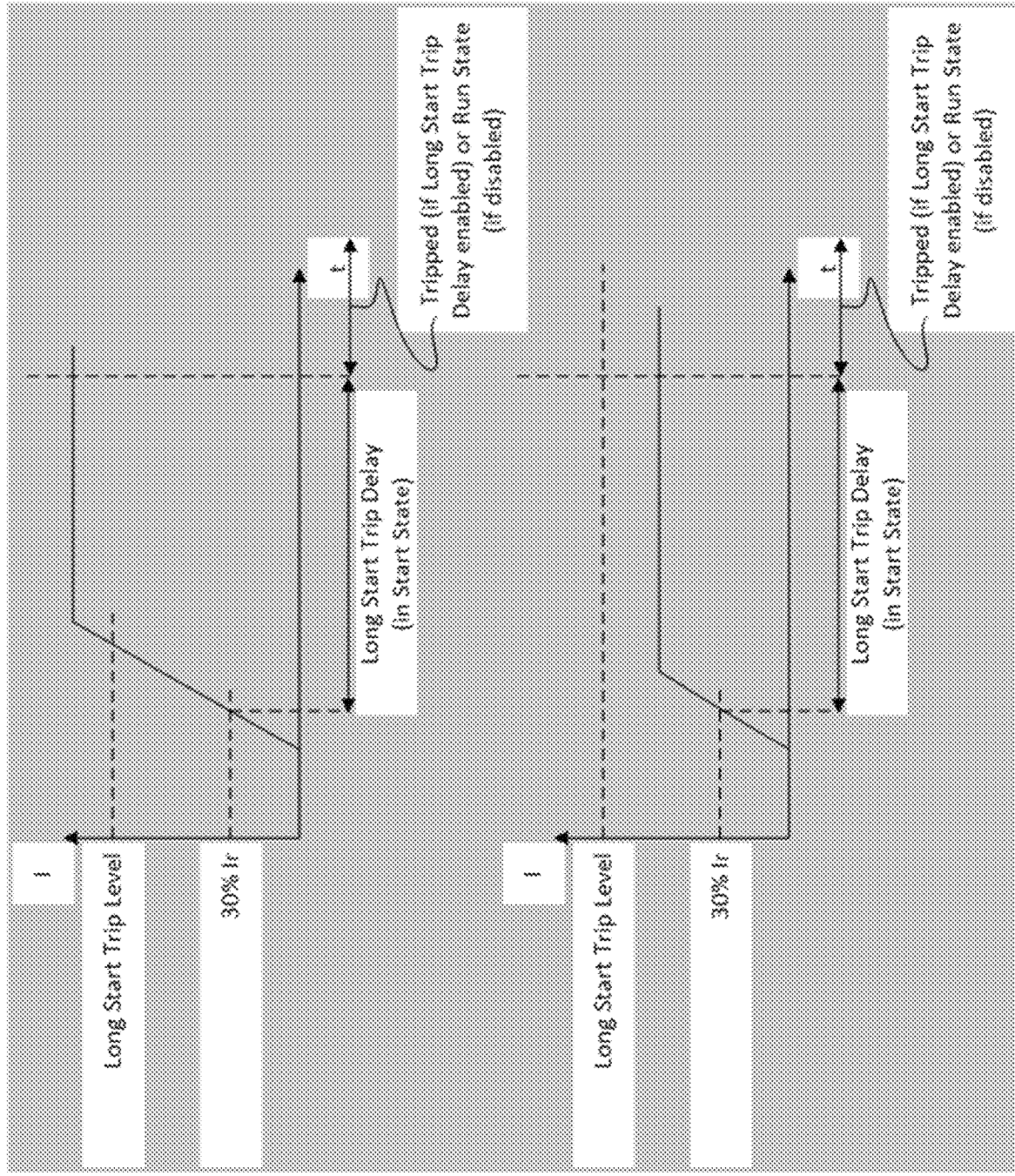
FIG. 2C shows an example graphical view of an example prior art protection algorithm for detecting a long start fault and trip.

The motor overload relay 110A reads the current for each of the three phases going to the motor 120A, for example, and tracks it over time relative to certain customer-programed settings. A long start fault protection algorithm compares the current when the motor is initially starting relative to an expected "motor start curve". Typically, a starting motor goes to a very high current (above a set threshold) and then drops to a lower steady-state current, over a period of ~5-20 seconds (less or more depending on the application and motor construction). Long start fault protection tries to detect two potential issues: one issue is if the motor turns on but does not ever go above the set threshold current. This indicates that the motor is completely unloaded or some other application issue. The other issue is if the motor current goes above the threshold current, but never again drops below to a "normal" steady-state level. This indicates that the motor has stalled. It may overlap with the "stall protection" function, but both protection functions may be enabled or disabled independently and set with different time or current thresholds, so they may protect different things, if desired by the user. The central controller 100 measures a trip delay or fault timeout between an occurrence of a long start fault and an occurrence of a trip for the motor 120A. FIG. 2C shows an example graphical view of an example prior art protection algorithm performed by the motor overload relay 110A or the central controller 100 for detecting a long start fault and trip, using a constant value for the fault timeout "T".

For a particular application, the user may specify a preference to enable the progressive protection method and may additionally enter parameters, such as which motors 120A to 120C are in the affected group, how long to consider a detected fault condition as linked among the motors, or a preferred adjustment of the fault timeout. If the progressive protection method is enabled, the existing protection algorithm may be modified as described in FIG. 3A or FIG. 3B. As soon as one motor overload relay 110A, for example, has detected a fault condition for motor 120A and has tripped, each of the other motors 120B-120C within the group will have its delay timer (fault timeout "T") modified for a short period of time (a Time window "W"). After the time window "W" has passed (when the fault conditions may no longer be considered linked), the protection settings for fault timeout "T" revert back to the previously defined levels.

For example, the central controller 100 monitors the group of three motors 120A to 120C through the three motor overload relay devices 110A to 110C. Each motor overload relay device 110A to 110C has a standard trip delay or fault timeout "T", for example, of 10 s. The central controller 100 has the progressive protection method enabled for a time window "W" of 3 minutes. Upon a fault condition detected and tripping in motor 120A, for example, it is likely that a similar fault condition may be detected in one of the other motors 120B-120C within the 3-minute time window "W", resulting in a motor tripping.

Figure 4:
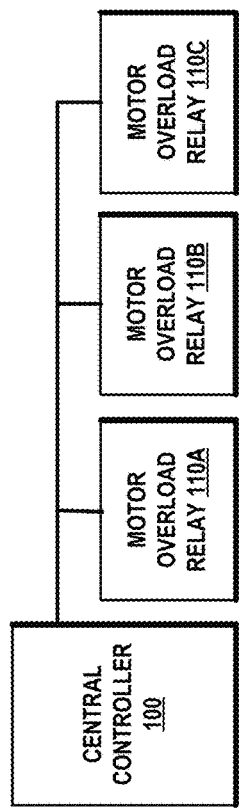
FIG. 4 is an example sequence diagram of a method, according to an embodiment of the disclosure
Figure 4:
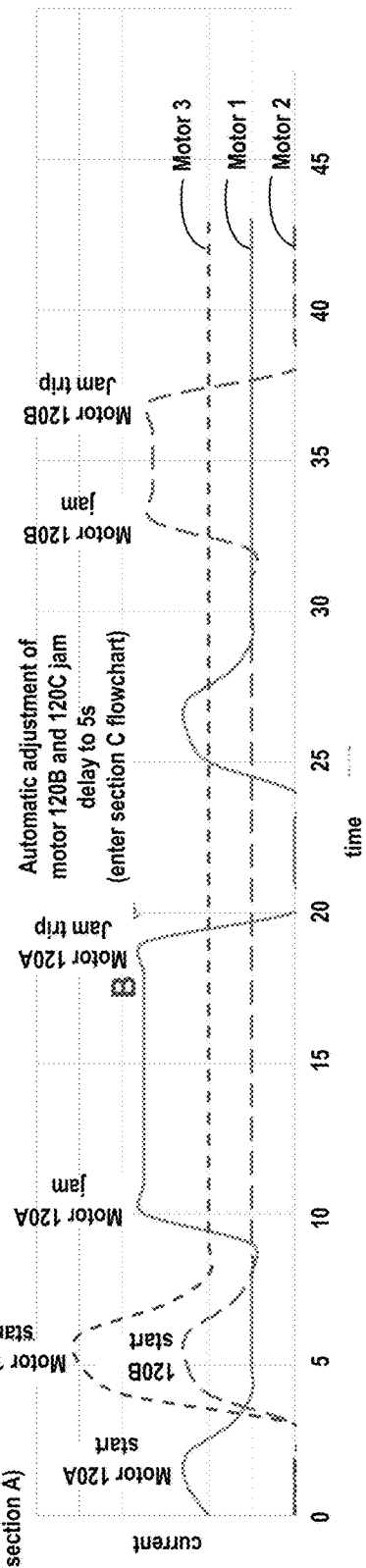

In a first example application, the user values strict protection of the motors over continuity of service (cost of replacing a motor is high relative to the time lost from a trip event). If there is a fault condition detected by one motor overload relay 110A, for example, that motor bears the increased load/wear during the fault condition for the duration of the pre-set trip delay or fault timeout "T". As this fault condition is likely to occur on other motors in the same group, the trip delay or fault timeout "T" for those motors may be decreased by the central controller 100 to trip them more quickly and reduce the wear. Thus, instead of having all motors in the system bear the full load of a trip, the system may be shut down more quickly to find and clear the root cause. The trip delay or fault timeout "T" is reduced by the central controller 100 in all of the motors 120A to 120C in the group. This is illustrated in FIG. 4 by the line depicting motor 120B's jam and subsequent rapid trip.

In another example application, the user values continuity of service over strict protection of the motors (cost of a machine stopping from a trip event is high relative to the cost of replacing a motor). If there is a fault condition detected by one motor overload relay 110A, for example, but the condition is cleared upon automatic reset of the motor (after the trip), then the root cause of the fault may be considered "not-critical" or "able-to-be-overcome". Under these conditions the trip delay or fault timeout "T" between fault detection and tripping the motor may be increased by the central controller 100 to prevent stoppage of the system for a fault condition that is likely to self-clear.

The user may specify parameters in the central controller 100 for the progressive protection method, such as which motors 120A to 120C are in the affected group, a time window "W" specifying how long to consider a detected fault condition as linked among the motors, or preferred adjustment of the trip delay or fault timeout "T". An example of the user's specification of parameters for the central controller 100 used to monitor motors in a conveyor group or alternately to monitor motors in a pipeline group, is shown in the following table:

| Application Group for progressive protection | Which motors in the group | Time Window W re fault linked among motors | Adjustment (Up or Down) of trip delay "T" | Amount of delay adjustment ΔT for each motor |
|---|---|---|---|---|
| Conveyor | 120A to 120C | 30 sec | Up | 5 sec |
| Pipeline | 120A to 120C | 60 sec | Down | 10 sec |

Based on the user's specification of the parameters in the example application, the central controller 100 determines whether to continue running the plurality of electric motors 120A-120C after detecting the occurrence of the trip, based on whether the application requires sustained running of all of the electric motors of the plurality. If the user has specified that the adjustment of the trip delay or fault timeout "T" is "up" or to increase, then the user has specified that it is more important to continue running the plurality of electric motors 120A to 120C in the group after recovering from the occurrence of the trip. Alternately, if the user has specified that the adjustment of the fault timeout "T" is "down" or to decrease, then the user has specified that it is more important to stop the running of the plurality of electric motors after the occurrence of the trip.

Based on the user's specification of the parameters for the particular application, the central controller 100 changes the trip delay or fault timeout "T" between an occurrence of a fault and an occurrence of a trip for all of the electric motors 120A to 120C of the plurality, from an initial duration value to a changed duration value for the trip delay, based on the determination.

Based on the user's specification of the parameters for the particular application, the central controller 100 may set a time window duration "W" during which the changed trip delay "T" remains in effect, commencing after the recovery from the occurrence of the trip. After expiration of the time window duration "W", the central controller 100 may change the trip delay or fault timeout "T", to the initial duration value, for all of the electric motors of the plurality.

Based on the user's specification for the particular application, if it is more important to continue running the plurality of electric motors after recovering from the occurrence of the trip than it is to stop the running of the plurality of electric motors after the occurrence of the trip, then the central controller 100 increases the trip delay or fault timeout "T" between an occurrence of a fault and an occurrence of a trip for all of the electric motors of the plurality, based on the determination.

Alternately, based on the user's specification for the particular application, if it is more important stop the running of the plurality of electric motors after the occurrence of the trip than it is to continue running the plurality of electric motors after recovering from the occurrence of the trip, then the central controller 100 decreases the trip delay or fault timeout "T" between an occurrence of a fault and an occurrence of a trip for all of the electric motors of the plurality, based on the determination.

Figure 3A:
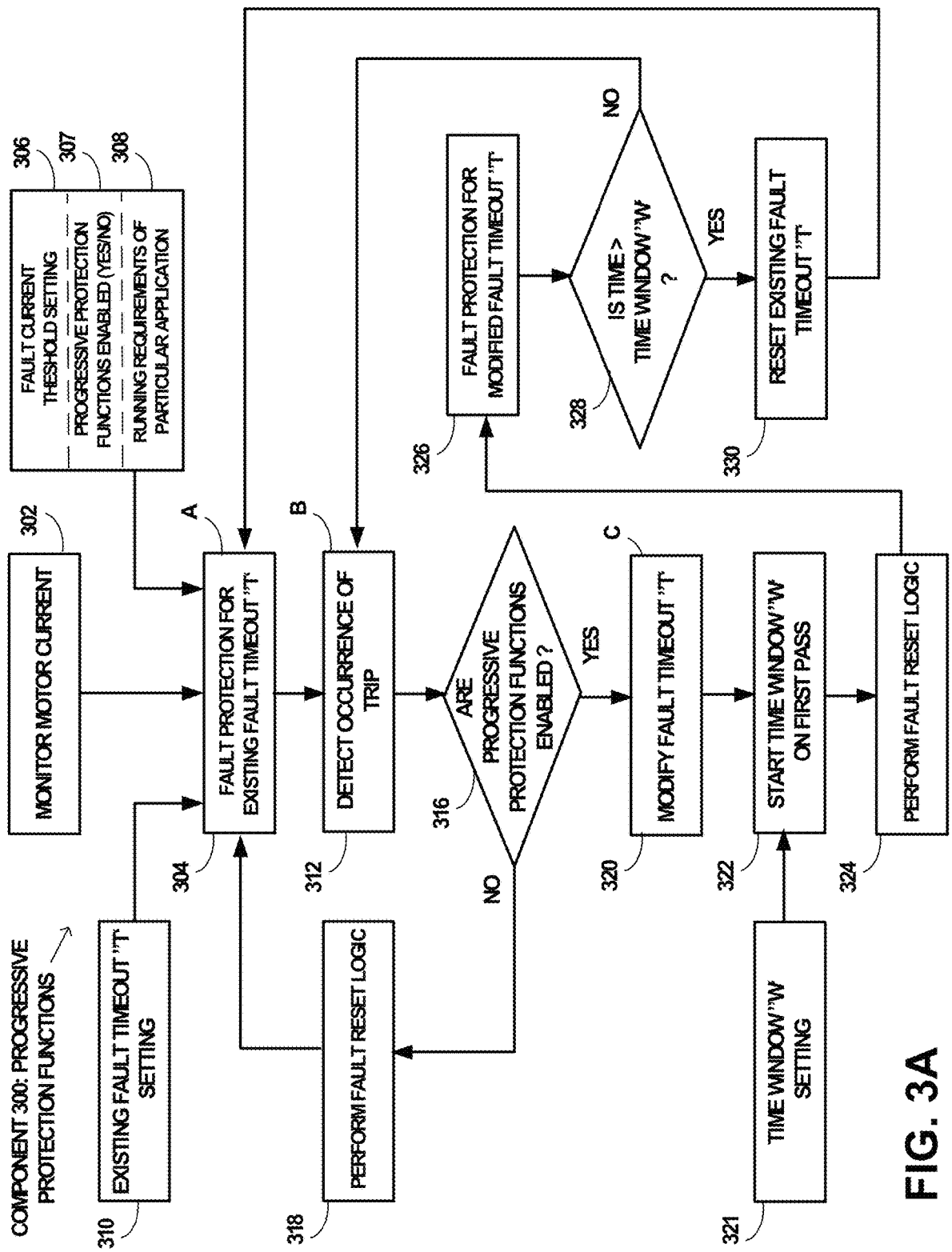
FIG. 3A is an example diagram of a progressive protection component in the memory of the central controller of FIG. 1, according to an embodiment of the disclosure.

FIG. 3A is an example diagram of the progressive protection component 300 in the memory 104 of the central controller 100 of FIG. 1, wherein the fault consequence to be detected is a trip of at least one of the electric motors 120A-120C of the plurality, according to an embodiment of the disclosure. The logic blocks of the progressive protection component 300 of FIG. 3A may be implemented by computer program instructions stored in the memory 104 and executed by the processor 102 in the central controller of FIG. 1. Alternately, the logic blocks of the progressive protection component 300 of FIG. 3A may also be implemented by computer hardware logic in the central controller of FIG. 1, which can carry out the functions specified by the logic blocks.

Block 302 monitors current used by each electric motor 120A-120C of the plurality of electric motors performing mutually similar or related tasks in the user's particular application. Block 306 inputs the user's selection of current threshold settings for the user's particular application. If the current exceeds that threshold for longer than the trip delay setting "T", then the protection will trip. Block 307 inputs the user's selection of whether the progressive functions are to be enabled (Yes or No) in the user's particular application. Block 308 inputs the user's selection of the running requirements of the particular application. The running requirements for a particular application specify whether to continue running the plurality of electric motors after detecting the occurrence of the trip, based on whether the application requires sustained running of all of the electric motors of the plurality.

The application may require that it is more important to continue running the plurality of electric motors after recovering from the occurrence of the trip. Accordingly, the application will require increasing the duration between the occurrence of the fault and the occurrence of the trip after the fault, for all of the electric motors of the plurality. This may be based on the determination that the application requires sustained running of all of the electric motors of the plurality. In some embodiments the duration is increased for at least a sub-plurality of the electric motors of the plurality.

Alternately, the application may require that it is more important to stop the running of the plurality of electric motors after detecting the occurrence of the trip. Accordingly, the application will require decreasing the duration between the occurrence of the fault and the occurrence of the trip after the fault, for all of the electric motors of the plurality. This may be based on the determination that the application does not require sustained running of all of the electric motors of the plurality. In some embodiments the duration is decreased for at least a sub-plurality of the electric motors of the plurality.

Block 304 receives the inputs from Blocks 302, 306, 307, 308, and 310 and performs fault protection for the existing fixed trip delay or fault timeout value "T", which is set as a fixed time input for the user's particular application, from the block 310. The fault condition must continue for this fixed trip delay "T" before a motor trip is issued. The type of fault protection may be selected by the user for the user's particular application. The fault protection may be for a jam fault, as shown in FIG. 2A, which is specifically looking at the highest phase of current and comparing it to a threshold current while in the "run state". The fault protection may be for a stall fault, as shown in FIG. 2B, which is specifically looking at the highest phase of current and comparing it to a threshold while in "start state". The fault protection may be for a long start fault, as shown in FIG. 2C, which is comparing the current when the motor is initially starting relative to an expected "motor start curve".

Block 312 detects the occurrence of a trip after an occurrence of a fault for at least one of the electric motors 120A-120C of the plurality, as a result of the fault protection performed by Block 304 for the existing fixed trip delay or fault timeout value "T".

Block 316 then determines whether the progressive protection functions are enabled, as the user has specified in Block 307. If the progressive protection functions are not enabled, then processing passes to Block 318 to perform fault reset logic. The fault condition detected by central controller 100 may be manually cleared or automatically "self-cleared", depending on the user's particular application.

As an example application, the motors 120A-120C may be controlling a rock crushing machine in a mining application. A dump truck may load a new pile of rocks into the machine and the size/density of rock may be too hard for the machine and one of the motors starts to jam (i.e., the motor enters the fault condition, which must continue for the trip delay "T" time period, to trip). After the motor trips, the motor may be manually cleared or may be automatically "self-cleared" of the fault condition, which is indicated by a reduced current detected by the Block 318 fault reset logic.

In an example conveying application, the motors 120A-120C may be sized to convey a 60 lb box. The user may set a fault warning threshold level at ~10% higher than the current required to move a 60 lb box, and set a trip threshold at 20% higher. When a 70 lb box accidentally gets added to the conveyor, the current may increase to the trip threshold level for a few seconds, for example a trip delay (time) setting of 15 sec. When the 70 lb box arrives at the first motor 120A the motor trips. After the motor trips, the motor is manually cleared or is automatically "self-cleared" of the fault condition, which is indicated by a reduced current detected by the Block 318 fault reset logic.

The process then loops back to Block 304 and performs fault protection for the existing fixed trip delay or fault timeout value "T".

If Block 316 determines that the progressive protection functions are enabled, then processing passes to Block 320. Block 320 modifies the duration of the trip delay "T" between an occurrence of a fault and an occurrence of a trip, changing it from an initial value to a modified value "T", for all of the electric motors of the plurality. The modified value of the trip delay is specified by the user for the particular application. The value of the trip delay "T" will be increased for all of the electric motors of the plurality, based on the determination that the application requires sustained running of all of the electric motors of the plurality. The value of the trip delay "T" will be decreased for all of the electric motors of the plurality, based on the determination that the application does not require sustained running of all of the electric motors of the plurality.

Block 322 starts a time window "W" the first pass or time that a trip has been detected and continues the time window for a predetermined period during which the modified trip delay "T" remains in its changed status. Block 321 inputs the time window "W" setting, which is specified by the user for the particular application.

Block 324 performs fault reset logic to reset the detected fault condition. The fault reset may be manually cleared or automatically "self-cleared", depending on the user's particular application.

Block 326 performs fault protection for the modified trip delay or fault timeout value "T", which was modified by Block 320, changing it from an initial value to the modified value, for all of the electric motors of the plurality. The type of fault protection may be selected by the user for the user's particular application, and may include, for example, jam fault protection, stall fault protection, long start fault protection.

Block 328 determines whether the time window "W" has expired. If it has not expired, the process passes to Block 312 to detect an occurrence of another trip, using the modified trip delay value. If the time window "W" has expired, then the process passes to Block 330 to reset the modified trip delay "T" to its initial fixed value. The process then passes to Block 304 to perform fault protection using the initial fixed trip delay or fault timeout value "T".

Figure 3B:
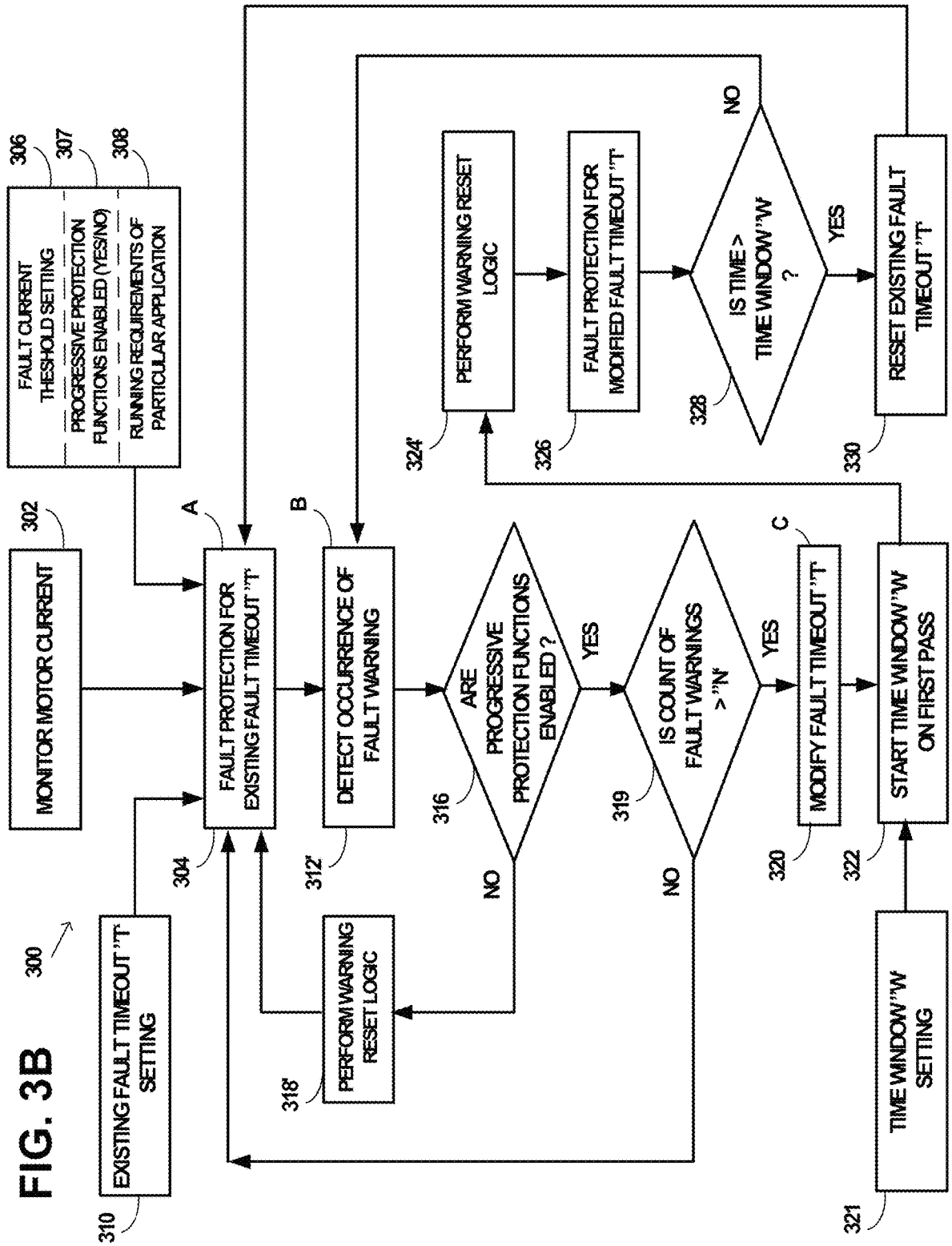
FIG. 3B is an example diagram of another progressive protection component in the memory of the central controller of FIG. 1, according to an embodiment of the disclosure.

FIG. 3B is an example diagram of another embodiment of the progressive protection component 300 in the memory 104 of the central controller 100 of FIG. 1, wherein the fault consequence to be detected is a predetermined number of fault warnings of at least one of the electric motors of the plurality, according to an embodiment of the disclosure. The logic blocks of the progressive protection component 300 of FIG. 3B may be implemented by computer program instructions stored in the memory 104 and executed by the processor 102 in the central controller of FIG. 1. Alternately, the logic blocks of the progressive protection component 300 of FIG. 3B may also be implemented by computer hardware logic in the central controller of FIG. 1, which can carry out the functions specified by the logic blocks. The embodiment of FIG. 3B is similar to the embodiment of FIG. 3A. The principal differences are in Blocks 312', 318', 319, and 324' of FIG. 3B.

Block 312' detects the occurrence of a fault warning. For example, in jam fault protection, the motor current is compared with a fixed warning current threshold and if the motor current is greater, a jam warning signal is issued. If the progressive protection functions are not enabled, then Block 318' performs warning reset logic to reset the fault warning condition detected by central controller 100, which may be manually cleared or automatically "self-cleared", depending on the user's particular application. The process loops back to Block 304 to perform fault protection for the existing fixed trip delay or fault timeout value "T".

If the progressive protection functions are enabled, then Block 319 counts the number of fault warnings that occur in a measurement period. If the number of fault warnings is less than a predetermined value "N", then the process loops back to Block 304 to perform fault protection using the existing fixed trip delay or fault timeout value "T". If the number of fault warnings exceeds the predetermined value "N", the occurrence of the predetermined number of fault warnings is the fault consequence. In response to detecting this fault consequence, Block 320 modifies the trip delay or fault timeout "T", as previously discussed for a trip fault consequence. Block 322 starts the time window "W" the first pass or time that a fault consequence has been detected and Block 324' performs warning reset logic to reset the fault warning condition. Then Block 326 performs fault protection for the modified trip delay or fault timeout value "T", which was modified by Block 320. Block 328 determines whether the present time has exceeded the time window "W". If the present time has not exceeded the time window "W", then the process loops back to Block 312' to detect the occurrence of another fault warning, using the modified trip delay or fault timeout value "T". If the present time has exceeded the time window "W", then the process passes to Block 330 to reset the trip delay or fault time out value "T" to the existing fixed trip delay or fault timeout value "T", and loops back to Block 304 to perform fault protection for the existing fixed trip delay or fault timeout value "T". The progressive protection component 300 of FIG. 3B detects a predetermined number of fault warnings of at least one of the electric motors of the plurality, as a fault consequence and, accordingly, modifies the trip delay or fault timeout "T", as previously discussed for a trip.

FIG. 4 is an example sequence diagram over a period of 50 seconds, of the progressive protection function method according to an embodiment of the disclosure. In this case the central controller 100 controls the group of three motor overload relay devices 110A, 110B, and 110C. Each device has standard trip delays of 10 sec, but the central controller 100 has the progressive protection function enabled (FIG. 3A, Block 316) for a time window "W" of 3 minutes. A fault condition is detected (FIG. 3A, Block 304 acting at time=10 sec) and tripping (FIG. 3A, Block 312 acting at time=18 sec) in motor 120A. The user's experience with the particular application indicates that a similar fault condition may be detected in one of the other motors 120B or 120C and that the similar fault condition will likely persist long enough to result in one of the other motors 120B or 120C tripping. Based on the user's experience with the particular application, it is not desirable to allow the other motors 120B or 120C to bear the full load/wear from the fault. Accordingly, trip delay "T" for all three motors is reduced (FIG. 3A, Block 320 acting at time=20 sec). The effect of the reduced trip delay "T" is shown by the line depicting motor 120B's subsequent jam fault (FIG. 3A, Block 326 acting at time=33 sec) and subsequent rapid trip (FIG. 3A, Block 312 acting at time=37 sec), which is a reduction in the modified trip delay "T" by approximately 50%.

Figure 5:
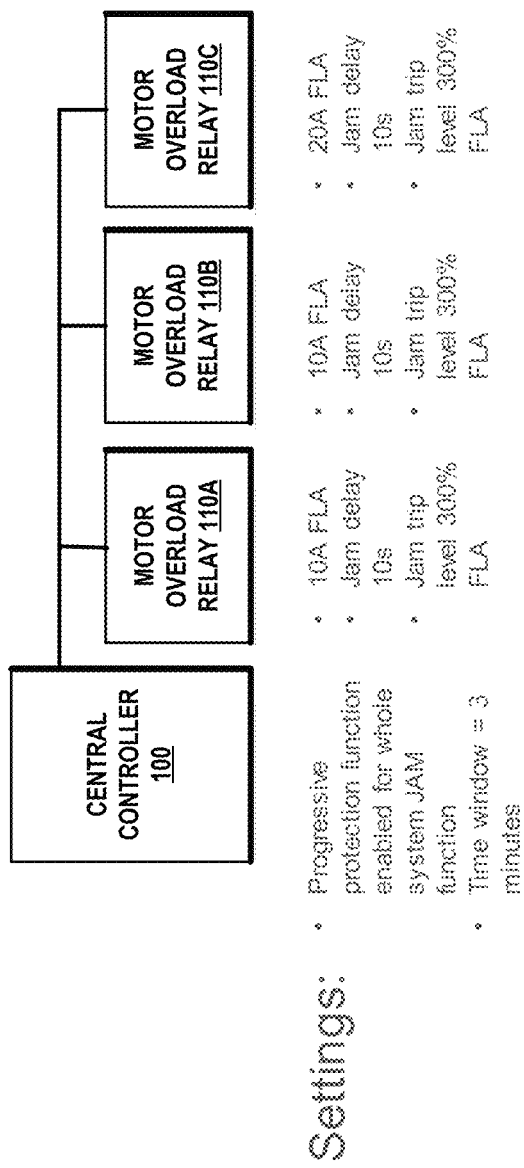
FIG. 5 is an example sequence diagram of yet another method, according to an embodiment of the disclosure Identical reference numerals have been used, where possible, to designate identical elements that are common to the figures. However, elements disclosed in one embodiment may be beneficially utilized on other embodiments without specific recitation.
Figure 5:
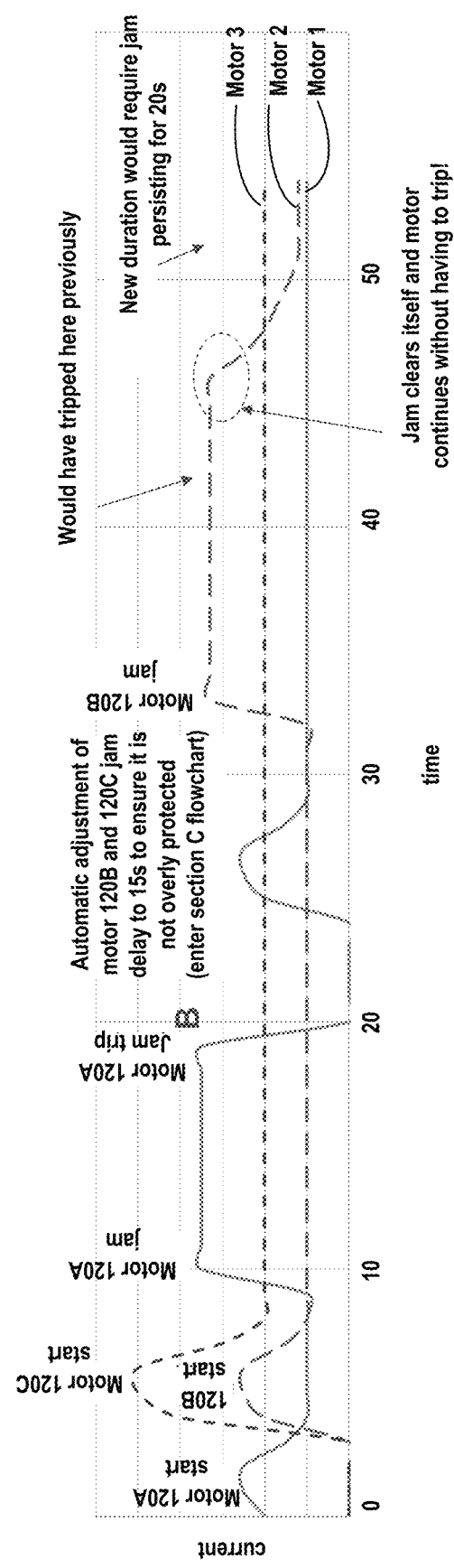

FIG. 5 is another example sequence diagram over a period of 50 seconds, of the progressive protection function method according to an embodiment of the disclosure. Similarly, the central controller 100 controls the group of three motor overload relay devices 110A, 110B, and 110C. Each device has standard trip delays of 10 sec, but the central controller 100 has the progressive protection function enabled (FIG. 3A, Block 316) for a time window "W" of 3 minutes. A fault condition is detected (FIG. 3A, Block 304 acting at time=10 sec) and tripping (FIG. 3A, Block 312 acting at time=18 sec) in motor 120A. In this alternate case, the user's experience with a second application indicates that a similar fault condition may be detected in one of the other motors 120B or 120C and that the similar fault condition will likely persist long enough to result in one of the other motors 120B or 120C tripping. Based on the user's experience with the second application, the user prefers continuity of service for the second application, and prefers to increase the trip delay time for all of the motors in the group. The user's past experience with the second application is that fault self-clearing occurs for the motors in the group. Accordingly, trip delay "T" for all three motors is increased (FIG. 3A, Block 320 acting at time=20 sec). The motor is able to self-clear before the new trip time. The effect of the increased trip delay "T" of 20 sec is shown by the line depicting motor 120B's subsequent jam fault (FIG. 3A, Block 326 acting at time=33 sec) and subsequent delay in the occurrence of any trip, thereby allowing the self-clearing of the fault by motor 120B (at time=46 sec). The increased value of the trip delay is 20 sec (FIG. 3A, Block 312 acting at time=53 sec), which is an increase in the modified trip delay "T" by approximately a factor of 2.

The resulting progressive protection method automatically adapts a protection trip delay or fault timeout for a motor that is a member of a group of motors performing mutually similar or related tasks, based on the occurrence of a fault in another motor within the group, without requiring manual intervention.

In an alternate embodiment, the progressive protection method may automatically change a fault current threshold between an occurrence of a fault and an occurrence of a trip, from an initial fault current threshold to a changed fault current threshold, for all of the electric motors of the plurality, based on the particular application.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method for protecting groups of electric motors, comprising:
    monitoring current used by each electric motor of a plurality of electric motors performing mutually similar or related tasks in an application;
    detecting an occurrence of a fault consequence after an occurrence of a fault for at least one of the electric motors of the plurality;
    determining whether to continue running the plurality of electric motors after detecting the occurrence of the fault consequence, based on whether the application requires sustained running of all of the electric motors of the plurality; and
    changing a duration between an occurrence of a fault and an occurrence of a subsequent fault consequence, from an initial duration to a changed duration, for all of the electric motors of the plurality, based on the determination.

2. The method of claim 1, wherein the fault consequence is at least one of a trip of at least one of the electric motors of the plurality or a predetermined number of fault warnings of at least one of the electric motors of the plurality.

3. The method of claim 1, further comprising:
    increasing the duration between the occurrence of the fault and the occurrence of the subsequent fault consequence, for all of the electric motors of the plurality, based on the determination that the application requires sustained running of all of the electric motors of the plurality.

4. The method of claim 1, further comprising:
decreasing the duration between the occurrence of the fault and the occurrence of the subsequent fault consequence, for all of the electric motors of the plurality, based on the determination that the application does not require sustained running of all of the electric motors of the plurality.

5. The method of claim 1, further comprising:
increasing the duration between the occurrence of the fault and the occurrence of the subsequent fault consequence, for at least a sub-plurality of the electric motors of the plurality, based on the determination that the application requires sustained running of the at least a sub-plurality of the electric motors of the plurality.

6. The method of claim 1, further comprising:
decreasing the duration between the occurrence of the fault and the occurrence of the subsequent fault consequence, for at least a sub-plurality of the electric motors of the plurality, based on the determination that the application does not require sustained running of the at least a sub-plurality of electric motors of the plurality.

7. The method of claim 1, further comprising:
starting a time window when the fault consequence has been detected and continuing the time window for a predetermined period during which the changed duration remains changed, and reverting the initial duration when the predetermined period for the time window expires.

8. The method of claim 1, wherein the determination is whether the application requires that it is more important to continue running the plurality of electric motors after recovering from the occurrence of the fault consequence or whether the application requires that it is more important to stop the running of the plurality of electric motors after detecting the occurrence of the fault consequence.

9. The method of claim 1, wherein the fault is at least one of a jam, a stall, a long start, or over-heating.

10. The method of claim 1, further comprising:
changing a fault current threshold between an occurrence of a fault and an occurrence of a subsequent fault consequence, from an initial fault current threshold to a changed fault current threshold, for all of the electric motors of the plurality, based on the determination.

11. An apparatus for protecting groups of electric motors, comprising:
a memory; and
a processing logic, operatively coupled to the memory, to:
monitor current used by each electric motor of a plurality of electric motors performing mutually similar or related tasks in an application;
detect an occurrence of a fault consequence after an occurrence of a fault for at least one of the electric motors of the plurality;
determine whether to continue running the plurality of electric motors after detecting the occurrence of the fault consequence, based on whether the application requires sustained running of all of the electric motors of the plurality; and
change a duration between an occurrence of a fault and an occurrence of a subsequent fault consequence, from an initial duration to a changed duration, for all of the electric motors of the plurality, based on the determination.

12. The apparatus of claim 11, wherein the fault consequence is at least one of a trip of at least one of the electric motors of the plurality or a predetermined number of fault warnings of at least one of the electric motors of the plurality.

13. The apparatus of claim 11, further comprising:
the processing logic, operatively coupled to the memory, to:
increase the duration between the occurrence of the fault and the occurrence of the subsequent fault consequence, for all of the electric motors of the plurality, based on the determination that the application requires sustained running of all of the electric motors of the plurality.

14. The apparatus of claim 11, further comprising:
the processing logic, operatively coupled to the memory, to:
decrease the duration between the occurrence of the fault and the occurrence of the subsequent fault consequence, for all of the electric motors of the plurality, based on the determination that the application does not require sustained running of all of the electric motors of the plurality.

15. The apparatus of claim 11, further comprising:
the processing logic, operatively coupled to the memory, to:
increase the duration between the occurrence of the fault and the occurrence of the subsequent fault consequence, for at least a sub-plurality of the electric motors of the plurality, based on the determination that the application requires sustained running of the at least a sub-plurality of the electric motors of the plurality.

16. The apparatus of claim 11, further comprising:
the processing logic, operatively coupled to the memory, to:
decrease the duration between the occurrence of the fault and the occurrence of the subsequent fault consequence, for at least a sub-plurality of the electric motors of the plurality, based on the determination that the application does not require sustained running of the at least a sub-plurality of electric motors of the plurality.

17. The apparatus of claim 11, further comprising:
the processing logic, operatively coupled to the memory, to:
start a time window when the fault consequence has been detected and continuing the time window for a predetermined period during which the changed duration remains changed, and reverting the initial duration when the predetermined period for the time window expires.

18. The apparatus of claim 11, wherein the determination is whether the application requires that it is more important to continue running the plurality of electric motors after recovering from the occurrence of the fault consequence or whether the application requires that it is more important to stop the running of the plurality of electric motors after detecting the occurrence of the fault consequence.

19. The apparatus of claim 11, wherein the fault is at least one of a jam, a stall, a long start, or over-heating.

20. A non-transitory computer-readable storage medium comprising executable instructions that when executed, by a processor, cause the processor to, comprising:

monitor current used by each electric motor of a plurality of electric motors performing mutually similar or related tasks in an application;

detect an occurrence of a fault consequence after an occurrence of a fault for at least one of the electric motors of the plurality;

determine whether to continue running the plurality of electric motors after detecting the occurrence of the fault consequence, based on whether the application requires sustained running of all of the electric motors of the plurality; and change a duration between an occurrence of a fault and an occurrence of a subsequent fault consequence, from an initial duration to a changed duration, for all of the electric motors of the plurality, based on the determination.

* * * * *